US011346954B2

(12) United States Patent
Garde

(10) Patent No.: US 11,346,954 B2
(45) Date of Patent: May 31, 2022

(54) MOUNTING A LASER TRANSCEIVER TO AN AIRCRAFT

(71) Applicant: Honeywell International Inc., Morris Plains, NJ (US)

(72) Inventor: Jason Garde, Anthem, AZ (US)

(73) Assignee: Honeywell International Inc., Charlotte, NC (US)

( * ) Notice: Subject to any disclaimer, the term of this patent is extended or adjusted under 35 U.S.C. 154(b) by 290 days.

(21) Appl. No.: 16/788,093

(22) Filed: Feb. 11, 2020

(65) Prior Publication Data
US 2020/0183015 A1 Jun. 11, 2020

Related U.S. Application Data

(62) Division of application No. 15/280,838, filed on Sep. 29, 2016, now Pat. No. 10,598,789.

(51) Int. Cl.
G01S 17/933 (2020.01)
G01S 17/58 (2006.01)
B64D 43/02 (2006.01)
G01C 23/00 (2006.01)
G01P 5/26 (2006.01)
G01P 13/02 (2006.01)
G01S 17/95 (2006.01)
G01S 7/481 (2006.01)

(52) U.S. Cl.
CPC .......... G01S 17/933 (2013.01); B64D 43/02 (2013.01); G01C 23/00 (2013.01); G01P 5/26 (2013.01); G01P 13/025 (2013.01); G01S 7/4813 (2013.01); G01S 17/58 (2013.01); G01S 17/95 (2013.01)

(58) Field of Classification Search
None
See application file for complete search history.

(56) References Cited

U.S. PATENT DOCUMENTS

| 8,434,358 | B2 | 5/2013 | Asahara et al. |
| 9,097,799 | B2 | 8/2015 | Inokuchi |
| 9,334,807 | B2 | 5/2016 | deGaribody |
| 2003/0219252 | A1 | 11/2003 | Hays |
| 2007/0097350 | A1 | 5/2007 | Halama |
| 2009/0152391 | A1 | 6/2009 | McWhirk |

(Continued)

FOREIGN PATENT DOCUMENTS

JP 2003156330 A 5/2003
KR 100898617 B1 5/2009

OTHER PUBLICATIONS

"Airborne LIDAR Survey Systems and Aviation Safety: an overview of concepts, qualifications and regulations", "prepared for Federal Aviation Administration by The Management Association for Private Photogrammetric Surveyors (MAPPS)", May 20, 2014, pp. 1-15.

(Continued)

Primary Examiner — Eric L Bolda
(74) Attorney, Agent, or Firm — Fogg & Powers LLC

(57) ABSTRACT

An aircraft is provided. The aircraft comprises: a fuselage; and a laser transceiver configured to transmit one or more laser light beams, wherein the laser transceiver is mounted to the aircraft at a waterline location along the center of the fuselage of the aircraft, wherein the center is between the top and bottom of the fuselage, and wherein the laser transceiver is configured to measure at least one air data parameter.

14 Claims, 9 Drawing Sheets

(56) References Cited

U.S. PATENT DOCUMENTS

| | | |
|---|---|---|
| 2011/0043785 A1 | 2/2011 | Cates et al. |
| 2011/0141471 A1 | 6/2011 | Schlotterbeck et al. |
| 2011/0219869 A1 | 9/2011 | Asahara et al. |
| 2012/0089362 A1 | 4/2012 | Mandle |
| 2015/0168439 A1 | 6/2015 | Genevrier et al. |
| 2016/0305977 A1 | 10/2016 | Genevrier et al. |
| 2018/0088239 A1 | 3/2018 | Garde |
| 2018/0284283 A1 | 10/2018 | Boucourt et al. |
| 2019/0079021 A1 | 3/2019 | Fan et al. |

OTHER PUBLICATIONS

"ALTACAS", "Retrieved May 18, 2016 from http://www.altacas.com/altacas.html", , pp. 1, Publisher: ALTACAS Technology.

"NESLIE:NEw Standby Lidar InstrumEnt", "Retrieved May 18, 2016 from http://oc.europa.eu/research/transport/projects/items/neslie_en.htm", , pp. 1-5, Publisher: European Commission.

"Windsceptor Optical Air Data Sensor Suite", "Retrieved May 19, 2016 from http://media.wix.com/ugd/d4c014_53d61c72deeb4c6f875cfca0c57a5b45.pdf", Jul. 11, 2014, pp. 1-4, Publisher: Optical Air Data Systems.

Aircraft Systems, "Location Numbering Systems—Aircraft Structures", Aeronautics Guide, published date unknown, pp. 1-4.

European Patent Office, "Communication under Rule 71(3) from EP Application No. 17191994.7", from Foreign Counterpart to U.S. Appl. No. 15/280,838, filed Aug. 6, 2018, pp. 1-30, Published: EP.

European Patent Office, "EP Search Report from EP Application No. 17191994.7 dated Nov. 22, 2017", from Foreign Counterpart of U.S. Appl. No. 15/280,838, filed Nov. 22, 2017, pp. 1-15, Published in: EP.

J.A. Overbeck et al., "Airborne Lidar System Profiles Wind Fields", "http://www.laserfocusworld.com/articles/print/volume-32/issue-4/world-news/airborne-lidar-system-profiles-wind-fields.html [Nov. 9, 2017]", Jan. 4, 1996, pp. 1-10, Publisher: Laser Focus World.

U.S. Patent and Trademark Office, "Notice of Allowance", U.S. Appl. No. 15/280,838, filed Nov. 14, 2019, pp. 1-5, Published: US.

U.S. Patent and Trademark Office, "Office Action", U.S. Appl. No. 15/280,838, filed Jun. 26, 2019, pp. 1-16, Published: US.

U.S. Patent and Trademark Office, "Restriction Requirement", U.S. Appl. No. 15/280,838, filed Feb. 6, 2019, pp. 1-8, Published: US.

Verbeek et al., "Optical Air Data System Flight Testing", "The Avionics Europe 2012 Conference, Mar. 21-22, 2012", , pp. i-26, Publisher: Nationaal Lucht- en Ruimtevaartlaboratorium, Published in: Munich, Germany.

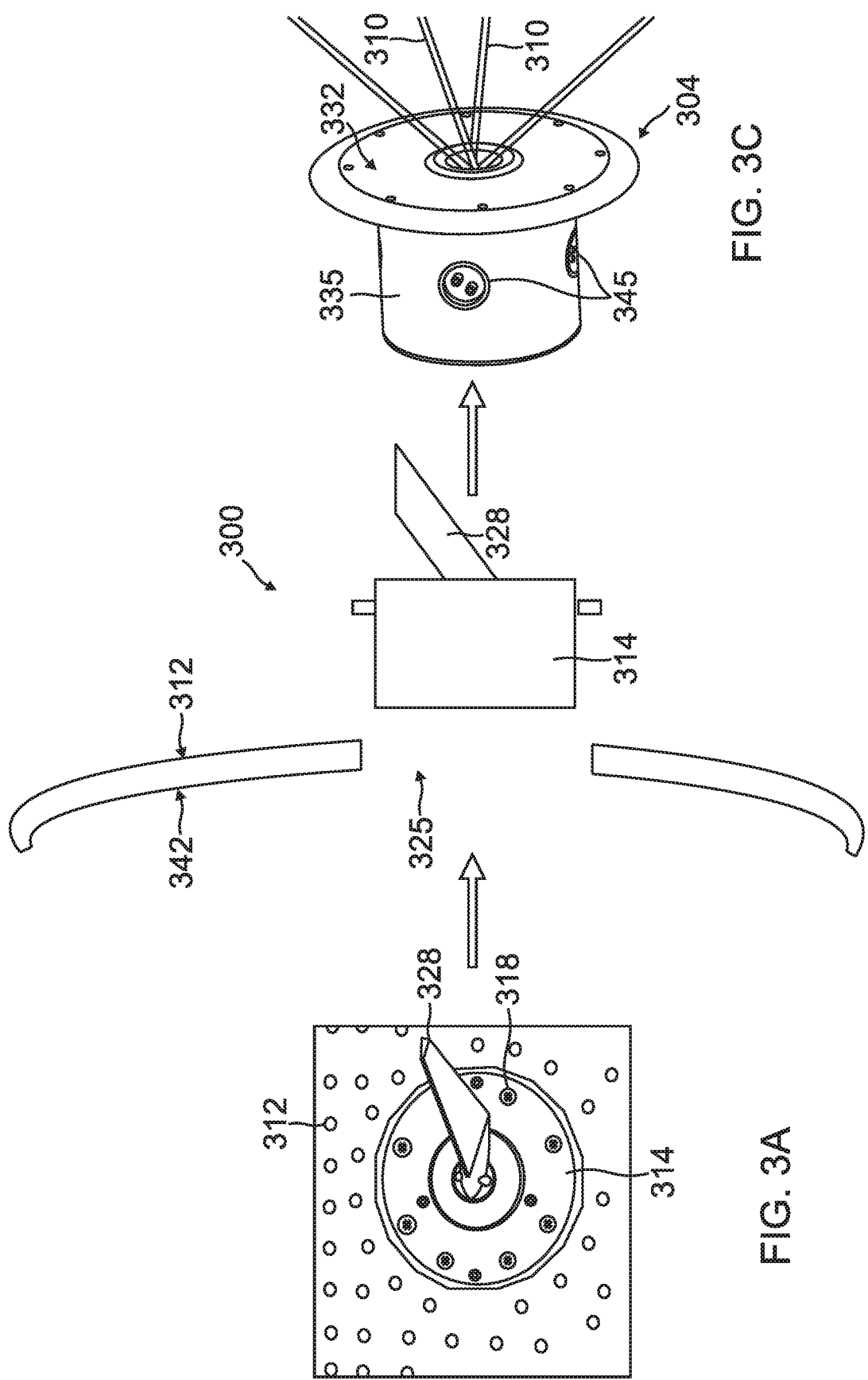

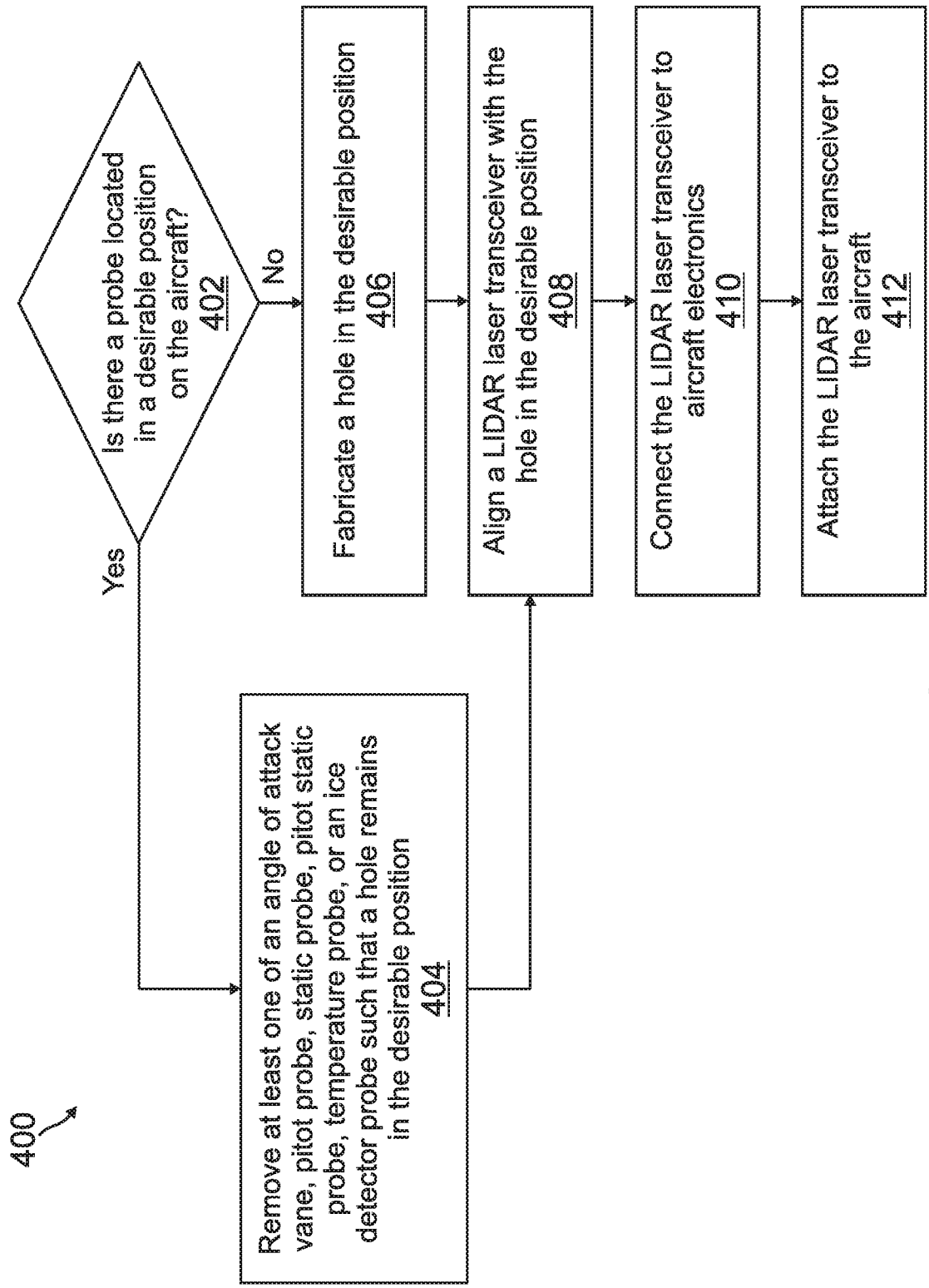

MOUNTING A LASER TRANSCEIVER TO AN AIRCRAFT

CROSS-REFERENCE TO RELATED APPLICATION

This application is a divisional application of U.S. application Ser. No. 15/280,838, filed on Sep. 29, 2016, which is herein incorporated by reference.

BACKGROUND

Many conventional aerospace systems use light detecting and ranging (LIDAR) laser transceivers to detect range for various applications including aerial mapping, scanning 3D objects surround an aircraft, etc. Further, LIDAR can use lasers for other aerospace applications including measuring air data parameters such as angle of airflow.

In conventional systems, air data parameters are measured by various probes. For example, angle of airflow is measured by angle of attack vanes, air speed is measured by pitot and/or static ports, and ice detection is measured by ice detector sensors mounted alongside the aircraft. While these probes are placed in optimum locations, there remains a risk of damage to the vanes and errors in the measurement due to external obstacles (such as a bird) hitting the vane protruding from these probes.

Typically, an aircraft has a life of approximately forty years. However, mounting the LIDAR laser transceiver on an existing (older) aircraft often requires fabricating new holes in the aircraft and including additional wiring to connect the aircraft's processing system to the LIDAR laser transceiver.

For the reasons stated above and for other reasons stated below which will become apparent to those skilled in the art upon reading and understanding the specification, there is a need in the art for improvement of mounting a LIDAR laser transceiver.

SUMMARY

A method of mounting at least one laser transceiver on an aircraft is provided. The method comprises: determining whether there is a probe located in a desirable position on the aircraft; when a probe is located in a desirable position: removing the located probe such that at least one hole remains in a desirable position, wherein the located probe is selected from the group consisting of an angle of attack vane, a pitot probe, a static port, a pitot static probe, a temperature probe, or an ice detector probe; aligning the at least one laser transceiver with at least one hole that remains after removing the located probe; connecting the at least one laser transceiver to aircraft electronics; and attaching the at least one laser transceiver to the aircraft aligned with the at least one hole; when a probe is not located in a desirable position: fabricating at least one hole in the desirable position; aligning the at least one laser transceiver with the at least one fabricated hole; connecting the at least one laser transceiver to aircraft electronics; and attaching the laser transceiver to the aircraft aligned with the at least one hole; wherein the at least one laser transceiver is configured to measure at least one air data parameter.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 3A-3E illustrate an example retrofit process of mounting a laser transceiver to an aircraft.

FIG. 4 is a flow diagram illustrating an exemplary method for mounting a laser transceiver to an aircraft.

Figure 1A:
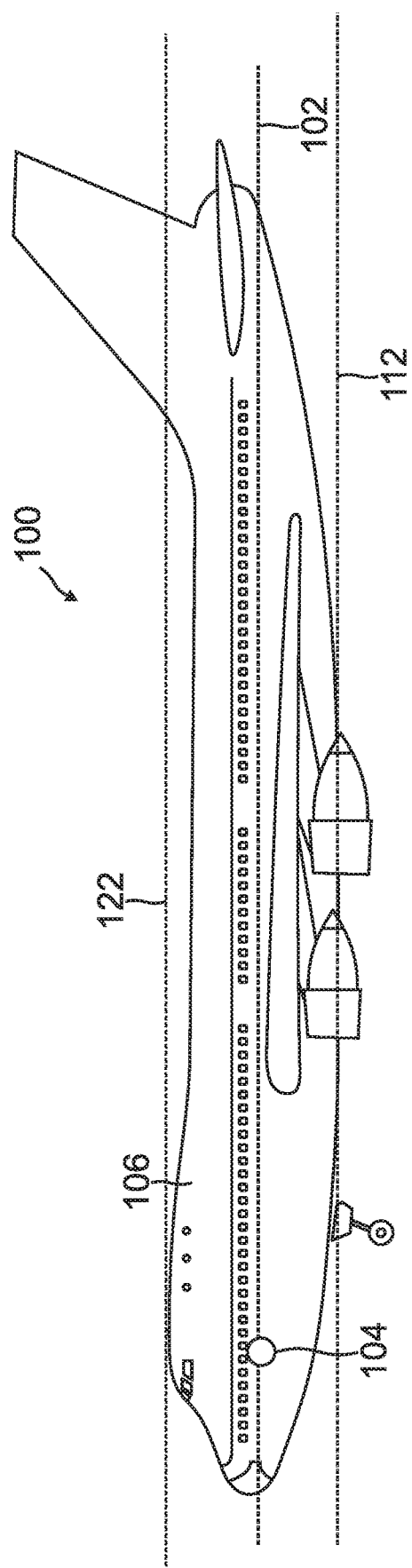
FIG. 1A illustrates a side view of an example aircraft with a laser transceiver mounted.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure describe systems and methods for mounting at least one laser transceiver to an aircraft. The laser transceivers described herein can be used to obtain air data parameters. Embodiments of the present disclosure describes mounting laser transceivers in existing aircrafts and/or new aircrafts. In example embodiments, this laser transceiver may be a Light Detecting and Ranging (LIDAR) laser transceiver.

Figure 1B:
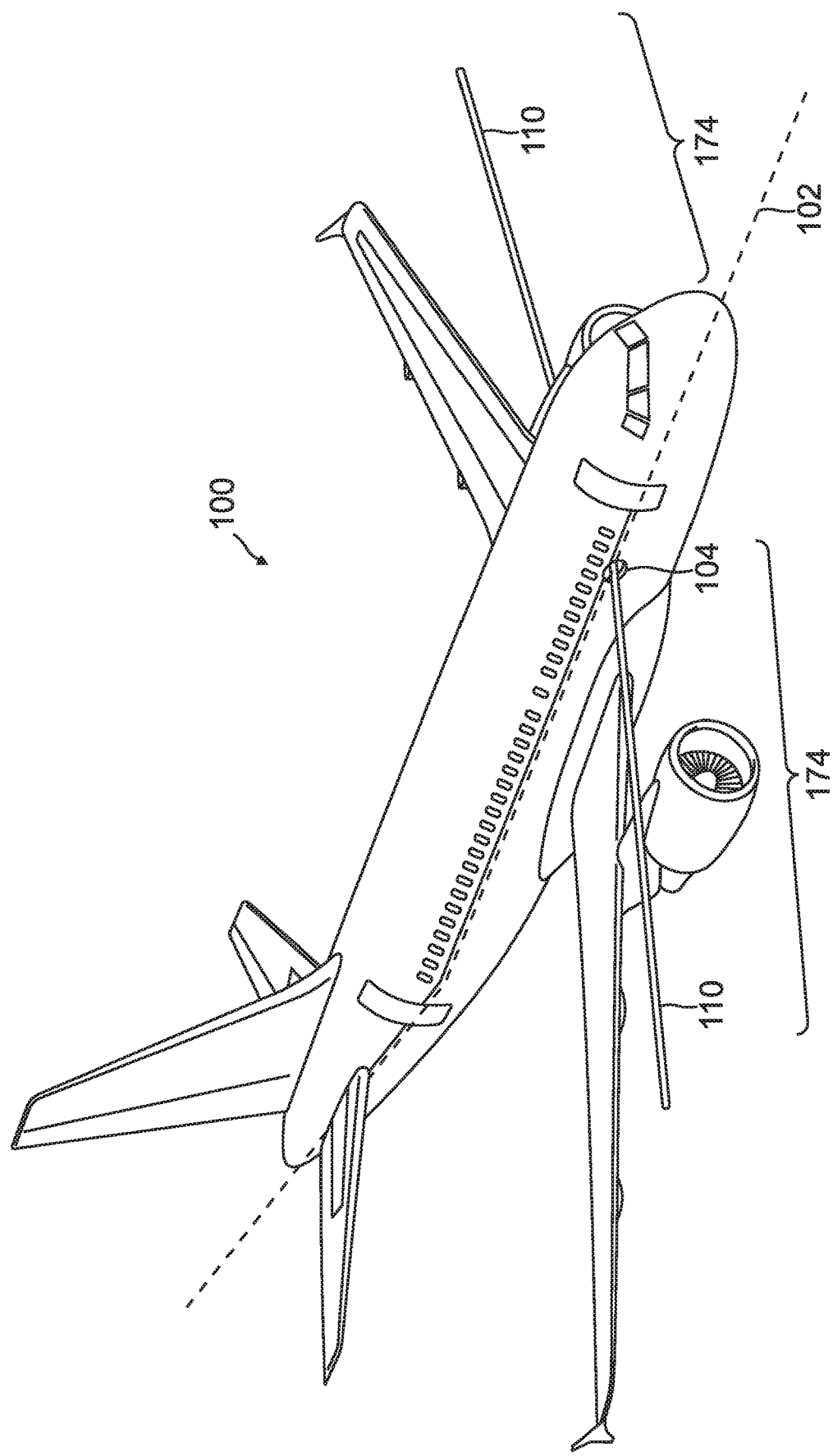
FIG. 1B illustrates a perspective view of the example aircraft of FIG. 1A.

FIGS. 1A-1B describe an example mounting configuration for a laser transceiver for an aircraft 100 according to one embodiment of the present disclosure. Specifically, FIG. 1A shows a side view of aircraft 100 having a laser transceiver 104 mounted to the aircraft. As shown in FIG. 1A, aircraft 100 includes at least one laser transceiver 104 mounted along a waterline 102. In example embodiments, at least one laser transceiver 104 is a LIDAR laser transceiver.

A waterline (WL) of an aircraft designates location in the height of the aircraft from ground up. In the example shown in FIG. 1, laser transceiver is mounted along a waterline 102, wherein waterline 102 runs along a center of fuselage 106 of aircraft 100. In the example shown in FIG. 1, the center of the fuselage is in the middle (halfway) between bottom 112 of aircraft 100 and top 122 of the aircraft 100.

FIG. 1B shows a perspective view of aircraft 100 having laser transceiver 104 mounted to aircraft 100 at waterline 102. As shown in FIG. 1B, laser transceiver 104 is configured to transmit one or more laser beams 110. These laser beams 110 are transmitted in a selected beam region 174. In example embodiments, laser beams 110 are transmitted as far as 10 meters out and beam region 174 is 10 meters away from the outer surface of aircraft 100. The air data parameters measured within beam region 174 are not disturbed by aircraft 100.

Figure 1C:
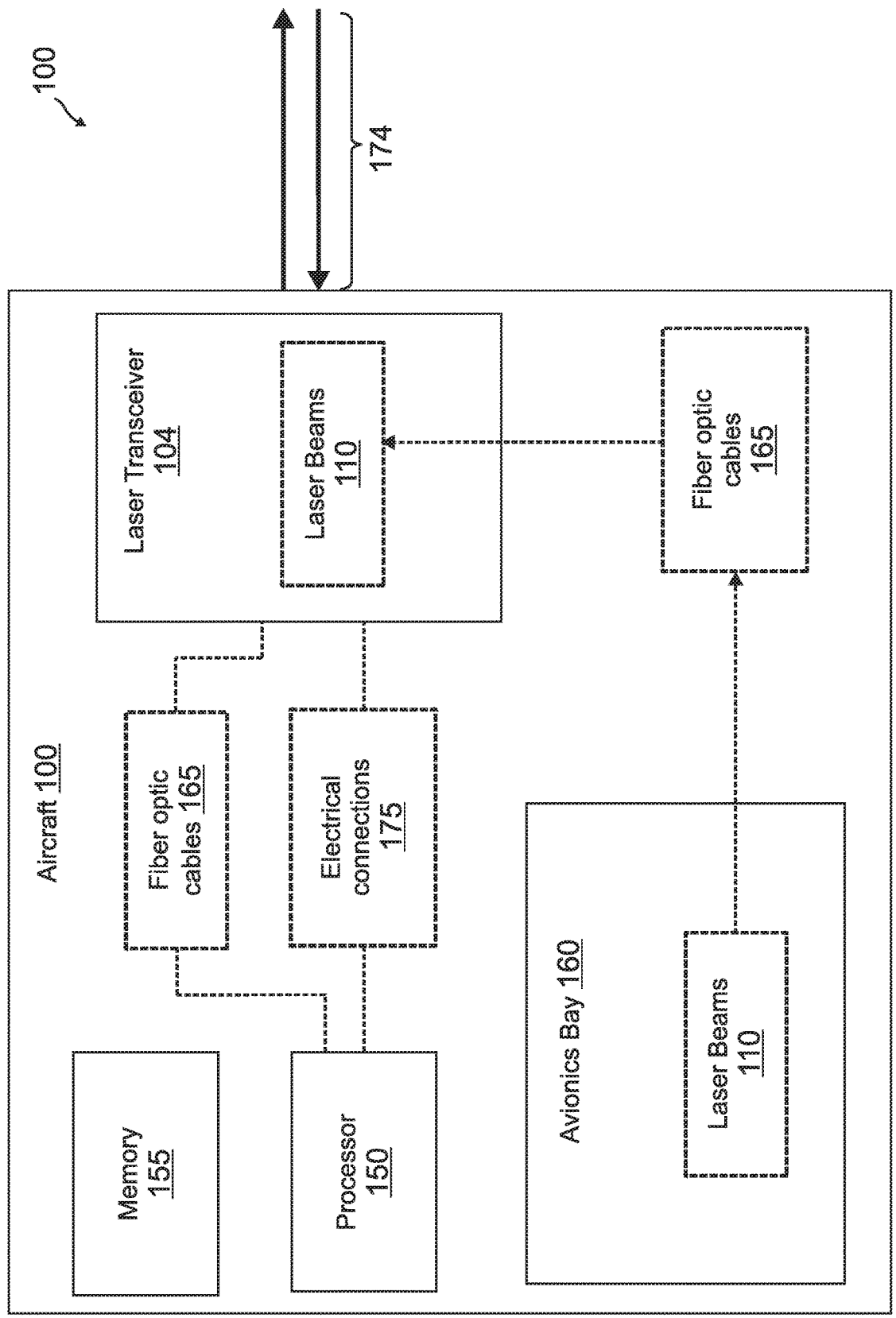
FIG. 1C is a block diagram of the example aircraft of FIG. 1A.

FIG. 1C is a block diagram of example aircraft 100 that has laser transceiver 104 mounted to it. In an example, these laser beams 110 may be generated in a transceiver head of the laser transceiver 104. In an example, the laser beams are generated in an avionics bay 160 of aircraft 100. In such an example, the laser transceiver 104 is connected to fiber optic cables 165 and a fiber optic channel is used to send and receive light signals to the laser transceiver 110. These laser beams 110 are then transmitted by laser transceiver 104 for obtaining various measurements.

In an embodiment, laser transceiver 104 is further configured to measure air data parameters. The laser light beams 110 transmitted by laser transceiver 104 interact with particles in a volume of air in a beam region 174 and cause at least a portion of the one or more laser light beams 110 to be reflected back due to backscatter. When light beams 110 interact with atoms, molecules, or the like in the volume of air in beam region 174, the reflected portion of the laser beam due to this interaction is known as backscatter. Laser transceiver 104 includes collection optics that receive the reflection and the backscatter is processed by processor 150. Processor 150 is further configured to filter and digitize the backscatter signals into a computational value for air data parameters. These measurements may further be stored in a memory 155 included on aircraft 100.

Referring back to FIG. 1B, laser transceiver 104 is generally configured or tuned to obtain measurements from air that is in a predefined beam region 174 away from aircraft 100. This predefined beam region 174 is a volume of air near aircraft 100. In an example, this predefined beam region 174 can be controlled by adjusting the angle at which the one or more laser light beams 110 are transmitted from the laser transceiver 104. In an example, this angle can be adjusted by adjusting window(s) through which the light beams 110 are transmitted. In an example, the predefined beam region 174 can be controlled by geometrically adjusting the propagation of the one or more laser light beams 110.

In one embodiment, laser transceiver 104 is mounted to an outer surface of aircraft 100, such as the skin of aircraft 100. In example embodiments, laser transceiver 104 is flush mounted with the outer surface of aircraft 100 such that the outer edge of laser transceiver 104 is completely aligned with outer surface of aircraft 100. (See FIG. 3E). Flush mounting laser transceiver 104 reduces drag, limits damage and icing potential of laser transceiver 104 when measuring air data parameters.

Figure 2:
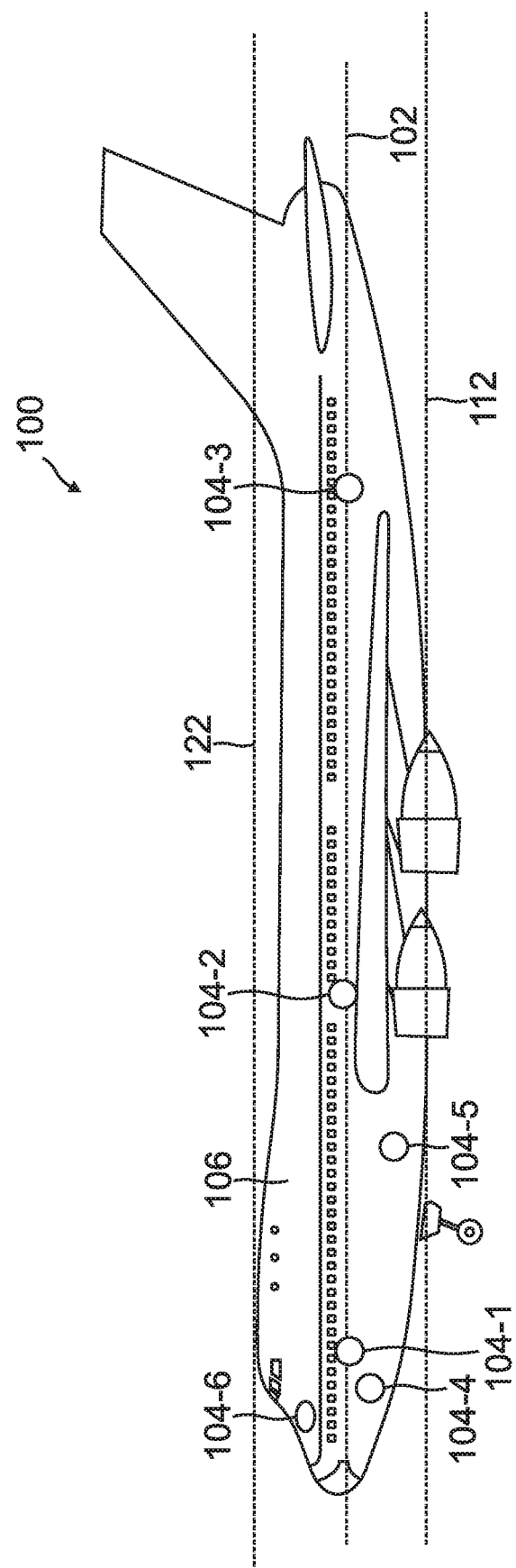
FIG. 2 illustrates example aircraft with laser transceivers mounted in various locations.

FIG. 2 shows an example of laser transceiver 104 mounted in various locations. For example, laser transceiver 104 may be mounted on waterline 102 along the center of the fuselage 106 in a front section of aircraft 100 (104-1), in a middle section of aircraft 100 (104-2), or in a back section of aircraft 100 (104-3).

In one embodiment, laser transceiver is configured to measure at least one of angle of air flow, air speed, angle of sideslip, air temperature, and air pressure. Conventionally, these parameters are measured by multiple probes, each probe configured to measure a respective function. These probes may include an angle of attack vane, a pitot probe, a static port, a pitot static probe, a temperature probe, or an ice detector probe.

Figures 3D, 3E:
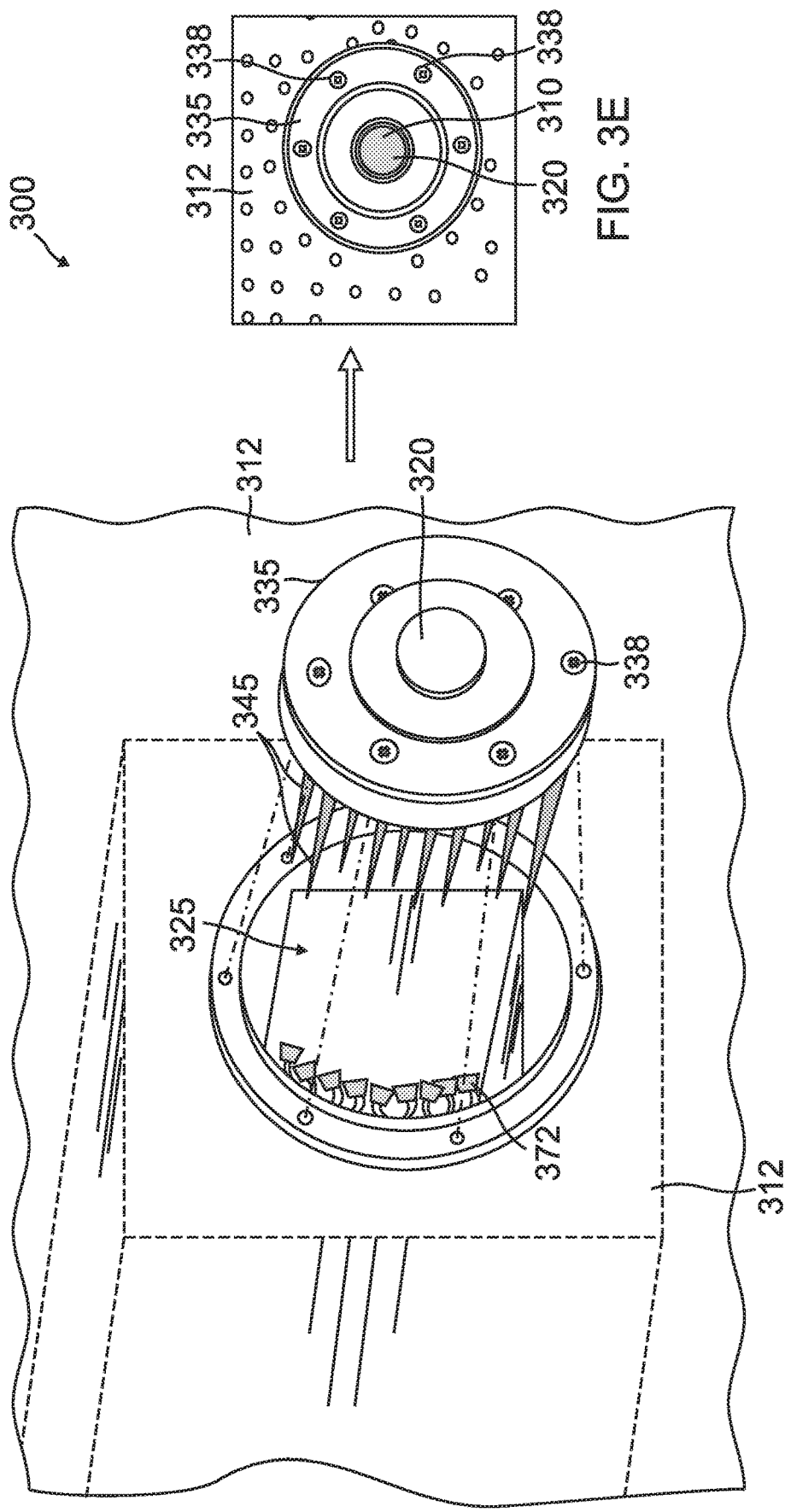

In one embodiment, the laser transceiver 104 is mounted in place of at least one of these probes. That is, the laser transceiver 104 is retrofit mounted to aircraft 100. For example, conventionally, angle of air flow in an aircraft is measured by angle of attack vanes that include a mechanical vane that changes direction depending on the angle of the airflow across the vane. FIGS. 3A-3E depict an exemplary process 300 of retrofit mounting a laser transceiver 104 to an aircraft. FIG. 3A illustrates an angle of attack vane 314 attached to skin 312 of an aircraft. Angle of attack vane 314 has a vane 328 that is used to measure the angle of attack in the aircraft. Due to vane 328 protruding out, there remains a risk of damage to the vanes and errors in the measurement due to external obstacles striking vane 328. In exemplary embodiments, the angle of attack vane 314 is attached to skin 312 with screws 318. The next step, shown in FIG. 3B, illustrates that angle of attack vane 314 can be removed by removing screws 318 and sliding the angle of attack vane 314 out of the aircraft. Hole 325 remains after the angle of attack vane 314 has been removed.

FIG. 3C shows a side view of an exemplary laser transceiver 304 to be mounted in hole 325 in place of the angle of attack vane 314 that has been removed. In the example shown in FIGS. 3C-3E, laser transceiver 304 is a LIDAR laser transceiver. Laser transceiver 304 includes a transceiver head 335 having an outer surface 332 and electrical connectors 345. In an example, transceiver head 335 generates laser beams transmitted by the laser transceiver 304. In an example, electrical and/or fiber optic cable connectors 345 connect the laser transceiver to aircraft electronics. In an example, the electrical and/or fiber optic cable connectors 345 are used to connect the laser transceiver 304 to an avionics bay, e.g., Avionics bay 160 of FIG. 1C, in aircraft.

Laser transceiver 304 is then aligned with hole 325 as illustrated in FIG. 3D. In the example shown in FIG. 3D, laser transceiver 304 has the same dimensions as the angle of attack vane 314. Laser transceiver 304 can be connected to aircraft electronics via aircraft electrical and/or fiber optic connectors 372. Laser transceiver 304 includes a window 320 to transmit laser beam through it.

Laser transceiver 304 is then attached to the aircraft by inserting laser transceiver 304 in hole 325. FIG. 3E illustrates a laser transceiver 304 after it is attached to the aircraft. In the example shown in FIG. 3E, laser transceiver 304 is flush mounted to skin 312 so that outer surface 332 of head 335 of laser transceiver 304 is aligned with the outer surface (skin 312) of the aircraft. As shown in FIG. 3E, after laser transceiver 304 has been connected to aircraft electronics 372 and is attached to aircraft laser transceiver 304, laser transceiver 304 transmits laser beam 310 through window 320.

Figure 5B:
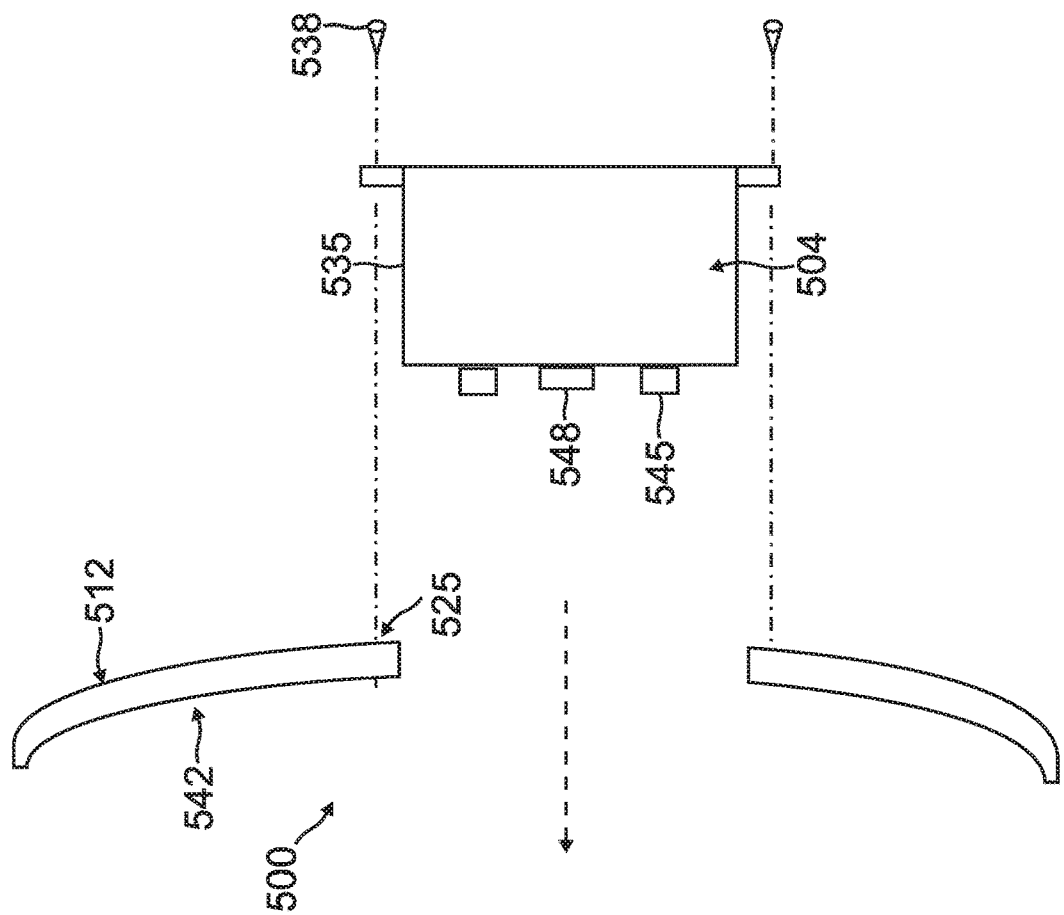
FIGS. 5A, 5B and 5C are side views in partial cross section that illustrate mounting a laser transceiver to the fuselage of an aircraft.
Figure 5A:
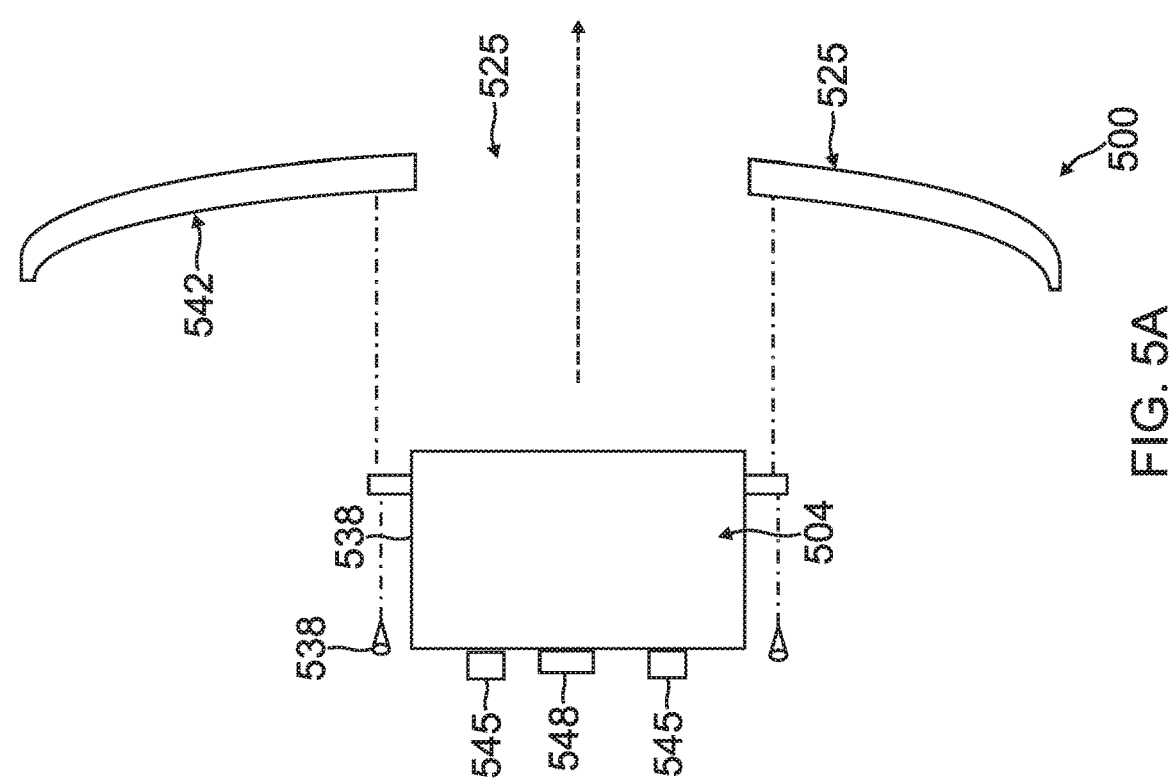

FIGS. 5A and 5B illustrate two different ways of attaching a laser transceiver to an aircraft. The example laser transceivers shown in FIGS. 5A and 5B are LIDAR laser transceivers. FIG. 5A illustrates an example of attaching laser transceiver 504 to an inner surface 542 of an aircraft 500. Aircraft 500 has a hole 525 drilled through it. In the example shown in FIG. 5A, hole 525 has dimensions approximately equal to laser head 535 of laser transceiver 504. Aircraft 500 also has an inner surface 542 and an outer surface 512. As shown in FIG. 5A, the laser transceiver 504 is pushed through hole 525 out to the aircraft and laser transceiver 504 is attached to inner surface 542 of the aircraft 500 using fastening means 538 (such as screws, alignment pins, etc.). In an example, laser transceiver 504 may be connected (not shown) to aircraft electronics using electrical connectors 548 and/or fiber connectors 545 prior to pushing laser transceiver 504 through hole 525 and attaching it to aircraft 500.

FIG. 5B illustrates an example of attaching laser transceiver 504 to an outer surface 512 of aircraft 500. In an example of an outer surface mount, the laser transceiver 504 slides into hole 525 of aircraft 500 and the laser transceiver is attached to the outer surface 512 of the aircraft using fastening means 538 (such as screws, alignment pins, etc.). In such an example, hole 525 can be approximately equal to or bigger than the laser transceiver head 504 so that the laser transceiver 504 can easily slide into hole 525 to connect to aircraft electronics and/or fiber optics. In an example, laser transceiver 504 is connected to aircraft electronics using electrical connectors 548 and/or fiber optic cable connectors 545 prior to sliding laser transceiver 504 into hole 525.

Figure 5C:
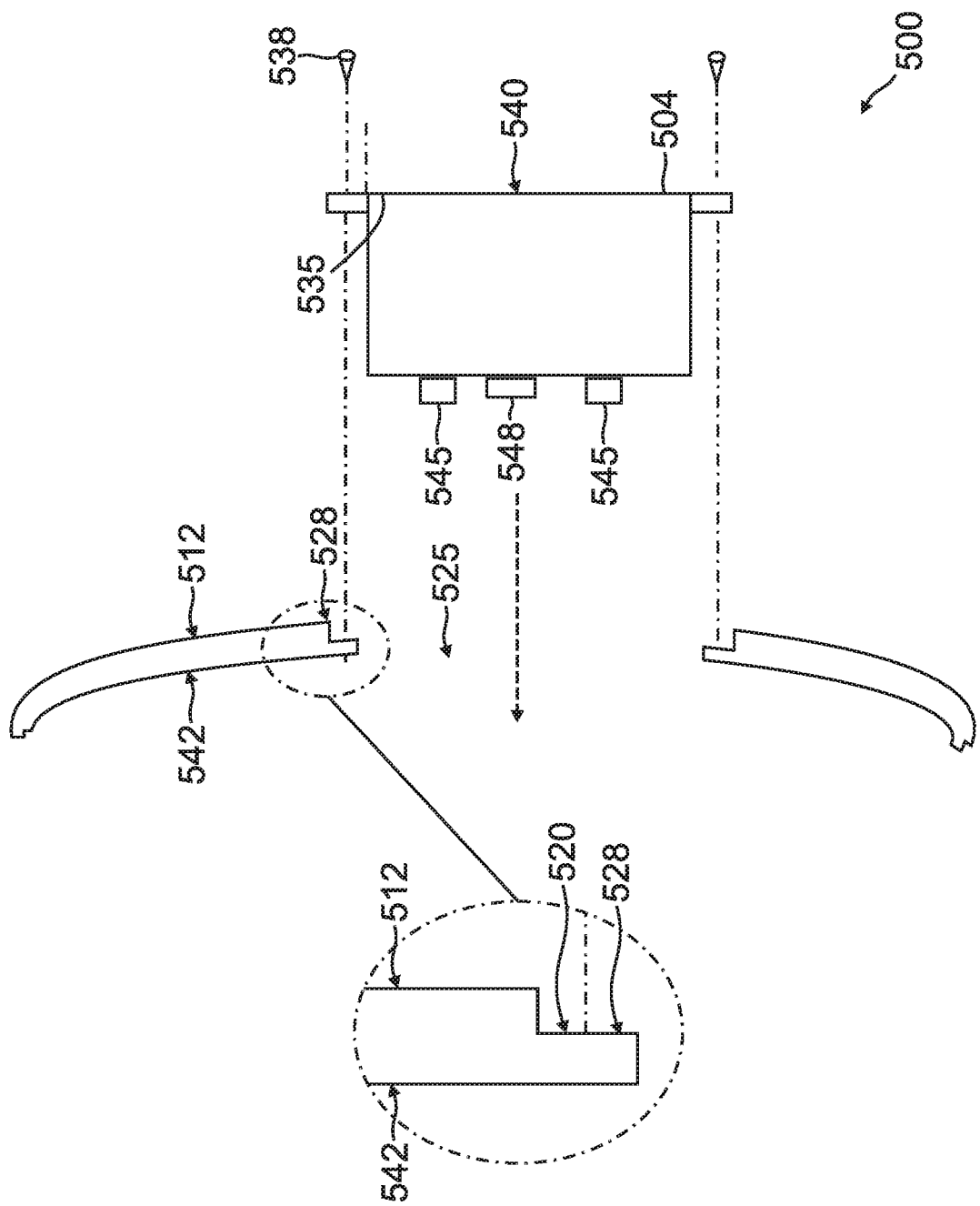

FIG. 5C illustrates an example of attaching laser transceiver 504 to aircraft 500 by flush mounting laser transceiver 504 to aircraft 500. In the example shown in FIG. 5C, hole 525 includes a recess 528 in aircraft 500 surrounding hole 525. In an example of a flush mount, laser transceiver 504 slides into recess 525 such that a flange around laser transceiver head 535 is attached to a recess surface 520 and face 540 of laser transceiver 504 is flush with outer surface 512 of aircraft 500. In such an example, the outer surface of the laser transceiver and the outer surface of the aircraft are aligned with each other without any protrusion. Laser transceiver 504 is connected to aircraft electronics using electrical connectors 548 and/or fiber optic cable connectors 545.

Referring back to FIG. 2, in an example, laser transceiver 104 may be mounted in the location of an angle of attack vane that has been removed (104-1), pitot probe that has been removed (104-4), a static port that has been removed (104-5) or an ice detector probe that has been removed (104-6). In example embodiments, at least two laser transceivers 104 have to be mounted to aircraft 100 to obtain air data parameters with optimum resolution.

In exemplary embodiments, laser transceiver 104 is configured to measure one or more air data parameters including air speed, angle of sideslip, angle of airflow, angle of attack, air temperature, air pressure, density and altitude of the aircraft. In exemplary embodiments, an existing sensor (such as a pitot probe, ice detector, angle of attack vane, etc.) and laser transceiver 104 are configured to measure a respective air data parameter. In such a case, data from both the existing sensor and the laser transceiver 104 are processed by processor 150.

For example, aircraft 100 may include four angle of attack vanes (two (two on each side of aircraft 100) to accurately measure angle of airflow. However, in one such example, two laser transceivers 104 retrofitted in a location of angle of attack vanes (one on each side of aircraft 100) may be sufficient to accurately measure the angle of airflow. In such an example, two of the four angle of attack vanes (one on each side of aircraft 100) may be removed and laser transceiver 104 is mounted in the location of the two angle of attack vanes that have been removed. The angle of airflow is measured by laser transceivers 104 and the two remaining angle of attack vanes on aircraft 100 and the data is processed by processor 150. Such a hybrid system is especially advantageous because it provides a back up option in a situation where one of the sensors (laser transceiver or angle of attack vane) fails.

In exemplary embodiments, laser transceiver 104 is configured to measure multiple air data parameters and the laser transceiver 104 may be retrofitted in a location of a first respective probe corresponding to first of the multiple air data parameters. In one such example, one or more probes corresponding to remaining of the multiple air data parameters may be removed and the hole that remains in location of one or more removed probes is closed. In one example, the hole may be closed by flush mounting a non-functional cover to an outer surface of aircraft 100.

FIG. 4 is a flow diagram showing an exemplary method 400 for mounting at least one laser transceiver, such as laser transceiver 104 to an aircraft, such as aircraft 100. Specifically, mounting laser transceiver on an existing aircraft enables the aircraft to measure air data parameters without having to fabricate additional holes or utilizing additional wiring. As discussed herein, method 400 is described with respect to examples of aircrafts shown in FIGS. 1A-3 and FIGS. 5A-5C. However, method 400 may apply to other examples of aircraft systems as well.

Method 400 begins at block 402 with determining whether there is a probe located in a desirable position on the aircraft. In exemplary embodiments, the desirable position is determined by the aircraft manufacturer or system integrator. In exemplary embodiments, the desirable position is determined to be the location at which the laser transceiver will provide optimum data and/or laser alignment over the course of the flight for the respective air data parameter that the laser transceiver is configured to measure. These air data parameters may be one or more of airspeed, Mach number, angle of sideslip, angle of airflow, angle of attack, air temperature, air pressure, density or altitude of the aircraft, and ice detection on the aircraft. In example embodiments, this desirable position may be along a waterline location of the aircraft, wherein the waterline location is along the center of a fuselage of the aircraft. In exemplary embodiments, the desirable position is determined based on the dimensions of the laser transceiver to be mounted to the aircraft. In such an example, the location of the probe determined to have dimensions approximately equal to the laser transceiver is determined as the desirable position on the aircraft.

When there is a probe located in a desirable position on the aircraft, method 400 proceeds to block 404 with removing at least one of an angle of attack vane, a pitot probe, a static port, a pitot static probe, a temperature probe, or an ice detector probe. In example embodiments, one or more of the probes removed are at a waterline location, wherein the waterline location is along the center of a fuselage of the aircraft. In some embodiments, the probe to be removed is attached with screws and alignment pins. In such embodiments, the probe is removed after removing the screws and alignment pins. Once the respective probe is removed a hole, such as hole 325 remains in place of the respective probe.

When there is not a probe located in a desirable position on the aircraft, method 400 proceeds to block 406 with fabricating at least one hole in a desirable position. In exemplary embodiments, this desirable position may be along a waterline location of the aircraft, wherein the waterline location is along the center of a fuselage of the aircraft.

In an example, method 400 then proceeds to block 408 with aligning the at least one laser transceiver with the at least one hole in the desirable position. This hole may be the one that remains after at least one of an angle of attack vane, a pitot probe, a static port, a pitot static probe, a temperature probe or an ice detector probe have been removed or a hole that has been fabricated on the aircraft. Laser transceiver is configured to measure at least the air data parameter. When at least one probe has been removed to create a hole in the desirable position, the laser transceiver is configured to measure air data parameter corresponding to the probe that has been removed. Laser transceiver may be configured to measure one or more air data parameters including air speed, angle of sideslip, angle of airflow, angle of attack, air temperature, air pressure, density or altitude of the aircraft.

After the laser transceiver is aligned in at least one of the hole that remained after removing the probe and the fabricated hole in the desirable position, method 400 then proceeds to block 410 with connecting the laser transceiver to aircraft electronics, such as aircraft electronics 372. In an example, method 400 proceeds to connecting the laser transceiver to aircraft electronics prior to aligning the at least one laser transceiver with the at least one hole in the desirable position. That is, in exemplary embodiments of this method, step 410 may be performed prior to step 408.

In example embodiments, connecting the laser transceiver to aircraft electronics includes coupling the laser transceiver to fiber optic cables, such as fiber optic cables 165, wherein a fiber optic channel is used to send and receive light signals to the laser transceiver to transmit laser light beams, such as laser light beams 110. These laser light beams are transmitted by laser transceiver and interact with particles in a volume of air. The interaction causes at least a portion of the one or more laser light beams to be reflected back due to backscatter. Laser transceiver 104 receives the reflection and the backscatter is processed by processor 150. Processor 150 is configured to filter and digitize the backscatter signals into a computational value for air data parameters. These measurements may further be stored in a memory 155 included on aircraft 100.

Method 400 then proceeds to block 412 with attaching the laser transceiver to the aircraft aligned with the at least one hole. In example embodiments, attaching the laser transceiver to the aircraft includes mounting the laser transceiver to an outer surface of the aircraft and attaching the laser transceiver to an outer surface. In an example of an outer surface mount (See FIG. 5B), the laser transceiver slides into the aircraft and the laser transceiver is attached to the outer surface of the aircraft using fastening means (such as screws, alignment pins, etc.). In example embodiments, attaching the laser transceiver to the aircraft includes mounting the laser transceiver to an inner surface of the aircraft and attaching the laser transceiver to an inner surface. In an example of an inner surface mount (See FIG. 5A), the laser transceiver is pushed through the hole out to the aircraft and the laser transceiver is attached to the inner surface of the aircraft using fastening means (such as screws, alignment pins, etc.). In one example, attaching the laser transceiver to the aircraft include flush mounting the laser transceiver to an outer surface of the aircraft (See FIG. 5C). In such an example, the outer surface of the laser transceiver and the outer surface of the aircraft are aligned with each other without any protrusion.

In example embodiments, attaching the laser transceiver to the aircraft include flush mounting the laser transceiver to the outer surface of the aircraft, such as the skin. In such an example, the outer surface of the laser transceiver and the outer surface of the aircraft are aligned with each other without a protrusion. Thus, flush mounting laser transceiver to the outer surface of the aircraft reduces the risk of damage to probe vanes or errors caused in the measurements due to obstacles hitting a probe vane. Because the laser light beams transmitted by the laser transceiver propagate for several meters more than the reach of a conventional air data probe, the measurements are less affected by external disturbances.

In an example, after a hole is present in a desirable location (404 or 406), method 400 proceeds to aligning the at least one laser transceiver with the at least one hole in the desirable position, attaching the at least one laser transceiver with the at least one hole in the desirable position, and then connecting the laser transceiver to aircraft electronics. In an example, after a hole is present in a desirable location (404 or 406), method 400 proceeds to connecting the laser transceiver to aircraft electronics (410), then aligning the at least one laser transceiver with the at least one hole in the desirable position (408), and then attaching the at least one laser transceiver with the aircraft (412). In an example, after a hole is present in a desirable location (404 or 406), method 400 proceeds to aligning the at least one laser transceiver with the at least one hole in the desirable position (408), the connecting the laser transceiver to aircraft electronics (410), and then attaching the at least one laser transceiver with the aircraft (412).

EXAMPLE EMBODIMENTS

Example 1 includes an aircraft comprising: a fuselage; a laser transceiver configured to transmit one or more laser light beams, wherein the laser transceiver is mounted to the aircraft at a waterline location along the center of the fuselage of the aircraft, wherein the center is between the top and bottom of the fuselage, and wherein the laser transceiver is configured to measure at least one air data parameter.

Example 2 includes the aircraft of Example 1, wherein the aircraft further comprises fiber optic cables, wherein the at least one laser transceiver is coupled to fiber optic cables, and wherein a fiber optic channel is used to send and receive light signals via fiber optic cables to the at least one laser transceiver to transmit laser light beams.

Example 3 includes the aircraft of any of Examples 1-2, wherein the laser transceiver is a light detecting and ranging (LIDAR) laser transceiver.

Example 4 includes the aircraft of any of Examples 1-3, wherein the laser transceiver is configured to measure at least one of air speed, angle of sideslip, angle of airflow, angle of attack, air temperature, air pressure, density or altitude of the aircraft.

Example 5 includes the aircraft of any of Examples 1-4, wherein the laser transceiver is flush mounted with an outer surface of the aircraft, wherein the outer surface of the laser transceiver is aligned to the outer surface of the aircraft.

Example 6 includes the aircraft of any of Examples 1-5, wherein the aircraft includes a processor configured to filter and digitize signals received from the backscatter of laser light beams transmitted by the laser transceiver to provide a computational value for the at least one air data parameter.

Example 7 includes a method of mounting at least one laser transceiver on an aircraft, the method comprising: determining whether there is a probe located in a desirable position on the aircraft; when a probe is located in a desirable position: removing the located probe such that at least one hole remains in a desirable position, wherein the located probe is selected from the group consisting of an angle of attack vane, a pitot probe, a static port, a pitot static probe, a temperature probe, or an ice detector probe; aligning the at least one laser transceiver with at least one hole that remains after removing the located probe; connecting the at least one laser transceiver to aircraft electronics; and attaching the at least one laser transceiver to the aircraft aligned with the at least one hole; when a probe is not located in a desirable position: fabricating at least one hole in the desirable position; aligning the at least one laser transceiver with the at least one fabricated hole; connecting the at least one laser transceiver to aircraft electronics; and attaching the laser transceiver to the aircraft aligned with the at least one hole; wherein the at least one laser transceiver is configured to measure at least one air data parameter.

Example 8 includes the method of Example 7, wherein removing at least one of an angle of attack vane, a pitot probe, a static port, a pitot static probe, a temperature probe or an ice detector probe further comprises removing screws and alignment pins.

Example 9 includes the method of any of Examples 7-8, wherein the at least one laser transceiver is a light detecting and ranging (LIDAR) laser transceiver.

Example 10 includes the method of any of Examples 7-9, wherein attaching the at least one laser transceiver to the aircraft comprises mounting the at least one laser transceiver to an outer surface of the aircraft.

Example 11 includes the method of any of Examples 7-10, wherein attaching the at least one laser transceiver to the aircraft comprises attaching the at least one laser transceiver to an inner surface of the aircraft.

Example 12 includes the method of any of Examples 7-11, wherein attaching the at least one laser transceiver to the aircraft comprises flush mounting the at least one laser transceiver to an outer surface of the aircraft.

Example 13 includes the method of any of Examples 7-12, wherein the at least one laser transceiver is configured to measure at least one of the air speed, angle of sideslip, angle of airflow, angle of attack, air temperature, air pressure, density or altitude of the aircraft.

Example 14 includes the method of any of Examples 7-13, wherein connecting the at least one laser transceiver to aircraft electronics comprises coupling the laser transceiver to fiber optic cables, wherein light signals are sent to the laser transceiver via fiber optic cables to transmit laser light beams.

Example 15 includes the method of any of Examples 7-14, wherein removing at least one of an angle of attack vane, a pitot probe, a static port, a pitot static probe, a temperature probe, or an ice detector probe further comprises removing at least one of the angle of attack vane, the pitot probe, the static port, the pitot static probe, the temperature probe, or the ice detector probe at a waterline location, wherein the waterline location is along the center of a fuselage of the aircraft.

Example 16 includes the method of any of Examples 7-15, wherein determining whether a probe is located in a desirable position further comprises determining the location at which the laser transceiver will provide optimum data and/or laser alignment over the course of the flight for the respective air data parameter that the laser transceiver is configured to measure.

Example 17 includes the method of any of Examples 7-16, wherein determining whether a probe is located in a desirable position further comprises determining the location of a probe that is approximately equal in dimensions to the at least one laser transceiver.

Example 18 includes the method of any of Examples 7-17, further comprising processing signals received from the backscatter of laser light beams transmitted by the at least one laser transceiver to provide a computational value for the at least one air data parameter.

Example 19 includes the method of any of Examples 7-18, wherein the desirable position is a waterline location on the aircraft, wherein the waterline location is along the center of a fuselage of the aircraft, the wherein the center of a fuselage is between is between top and bottom of the aircraft Example 20 includes a method of mounting at least one laser transceiver on an aircraft, the method comprising: removing at least one angle of attack vane; aligning at least one light detecting laser transceiver with at least one hole that remains after removing the angle of attack vane, wherein the light detecting laser transceiver is configured to obtain measurements for at least one air data parameter; connecting the at least one light detecting laser transceiver to aircraft electronics; and attaching the at least one light detecting laser transceiver to the aircraft aligned with the at least one hole that remains after removing the angle of attack vane.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of mounting at least one laser transceiver on an aircraft, the method comprising:
   determining whether there is a probe located in a desirable position on the aircraft;
   when a probe is not located in a desirable position, fabricating at least one hole in the desirable position:
   when a probe is located in a desirable position,
      removing the located probe such that at least one hole remains in a desirable position, wherein the located probe is selected from the group consisting of an angle of attack vane, a pitot probe, a static port, a pitot static probe, a temperature probe, or an ice detector probe;
      aligning the at least one laser transceiver with at least one hole that has been fabricated or that remains after removing the located probe;
      connecting the at least one laser transceiver to aircraft electronics; and
      attaching the at least one laser transceiver to the aircraft aligned with the at least one hole;
   wherein the at least one laser transceiver is configured to measure at least one air data parameter; and
   wherein the desirable position is a waterline location of the aircraft, wherein the waterline location is along the center of a fuselage of the aircraft wherein the center is between the top and the bottom of the fuselage.

2. The method of claim 1, wherein removing at least one of an angle of attack vane, a pitot probe, a static port, a pitot static probe, a temperature probe or an ice detector probe further comprises removing screws and alignment pins.

3. The method of claim 1, wherein the at least one laser transceiver is a light detecting and ranging (LIDAR) laser transceiver.

4. The method of claim 1, wherein attaching the at least one laser transceiver to the aircraft comprises mounting the at least one laser transceiver to an outer surface of the aircraft.

5. The method of claim 1, wherein attaching the at least one laser transceiver to the aircraft comprises attaching the at least one laser transceiver to an inner surface of the aircraft.

6. The method of claim 1, wherein attaching the at least one laser transceiver to the aircraft comprises flush mounting the at least one laser transceiver to an outer surface of the aircraft.

7. The method of claim 1, wherein the at least one laser transceiver is configured to measure at least one of the air speed, angle of sideslip, angle of airflow, angle of attack, air temperature, air pressure, density or altitude of the aircraft.

8. The method of claim 1, wherein connecting the at least one laser transceiver to aircraft electronics comprises coupling the laser transceiver to fiber optic cables, wherein light signals are sent to the laser transceiver via fiber optic cables to transmit laser light beams.

9. The method of claim 1, wherein removing at least one of an angle of attack vane, a pitot probe, a static port, a pitot static probe, a temperature probe, or an ice detector probe further comprises removing at least one of the angle of attack vane, the pitot probe, the static port, the pitot static probe, the temperature probe, or the ice detector probe at a waterline location, wherein the waterline location is along the center of a fuselage of the aircraft.

10. The method of claim 1, wherein determining whether a probe is located in a desirable position further comprises determining the location at which the laser transceiver will provide optimum data and/or laser alignment over the course of the flight for the respective air data parameter that the laser transceiver is configured to measure.

11. The method of claim 1, wherein determining whether a probe is located in a desirable position further comprises determining the location of a probe that is approximately equal in dimensions to the at least one laser transceiver.

12. The method of claim 1, further comprising processing signals received from the backscatter of laser light beams transmitted by the at least one laser transceiver to provide a computational value for the at least one air data parameter.

13. The method of claim 1, wherein the desirable position is a waterline location on the aircraft, wherein the waterline location is along the center of a fuselage of the aircraft, the wherein the center of a fuselage is between is between top and bottom of the aircraft.

14. A method of mounting at least one laser transceiver on an aircraft, the method comprising:
  determining whether at least one angle of attack vane is located on the aircraft;
  when there is not at least one angle of attack vane located on the aircraft, fabricating at least one hole in the aircraft;
  when there is at least one angle of attack vane located on the aircraft, removing the at least one angle of attack vane, leaving the at least one hole on the aircraft;
  aligning at least one light detecting laser transceiver with the at least one hole, wherein the light detecting laser transceiver is configured to obtain measurements for at least one air data parameter;
  connecting the at least one light detecting laser transceiver to aircraft electronics; and
  attaching the at least one light detecting laser transceiver to the aircraft aligned with the at least one hole.

* * * * *